United States Patent [19]

Reed

[11] 3,822,615
[45] July 9, 1974

[54] WIRE AND CABLE INSULATION REMOVING DEVICE
[76] Inventor: Clovis H. Reed, 421 Merced St., Avenal, Calif. 93204
[22] Filed: Sept. 29, 1972
[21] Appl. No.: 293,387

[52] U.S. Cl.......................... 81/9.51, 72/221, 225/3
[51] Int. Cl........................ H01b 15/00, B26f 3/04
[58] Field of Search............ 81/9.5 R, 9.51; 83/430, 83/924; 225/3; 72/221

[56] References Cited
UNITED STATES PATENTS
2,390,369  12/1945  Hopper................................ 81/9.51
2,434,640  1/1948  Burdwood............................ 83/430
2,506,060  5/1950  Branson.............................. 81/9.51
3,641,852  2/1972  Terada............................ 81/9.51 X FOREIGN PATENTS OR APPLICATIONS
1,188,159  3/1965  Germany........................... 81/9.5 R Primary Examiner—Al Lawrence Smith
Assistant Examiner—K. J. Ramsey

[57] ABSTRACT

A power-operated device for removing insulation from various sized scrap wires and cables without burning, and thus improving the ecology by eliminating the discharge of smoke and fumes into the ambient atmosphere.

1 Claim, 10 Drawing Figures

PATENTED JUL 9 1974 3,822,615

WIRE AND CABLE INSULATION REMOVING DEVICE

BACKGROUND OF THE INVENTION

1. Field of the Invention

Wire and cable insulation removing device.

2. Description of the Prior Art

In the past, removal of insulation from scrap wire and cable has been done by burning prior to sale thereof. Burning of insulation from wire or cable results in discharge of substantial amounts of smoke and fumes into the atmosphere to contaminate the latter.

The primary purpose in devising the present invention is to provide power-operated means for stripping insulation from scrap copper wire without contaminating the atmosphere and thus improving the ecology.

SUMMARY OF THE INVENTION

A power-operated device wherein two parallel, laterally spaced rollers are power driven in the same direction to either remove insulation from scrap copper wire by crushing the insulation, or sever the insulation into longitudinally extending strips, depending upon the configuration of the rollers.

A primary object of devising the present invention is to supply a power-operated device that simply and effectively removes insulation from scrap copper wire or cable without discharging smoke or fumes into the ambient atmosphere to contaminate the latter.

DESCRIPTION OF THE PREFERRED EMBODIMENTS

Figure 1:
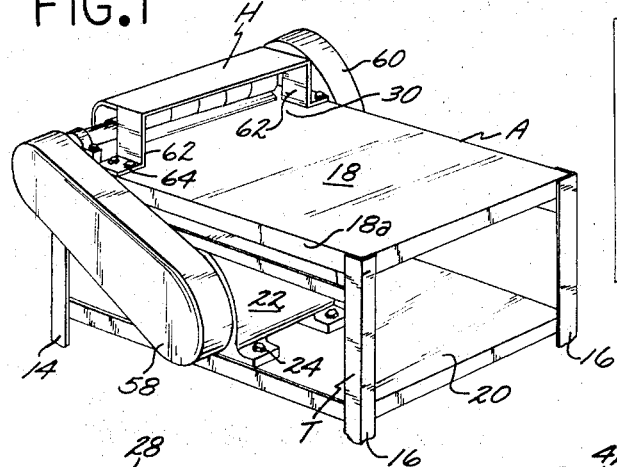
FIG. 1 is a perspective view of the device.

The device A for use in removing insulation from scrap copper wire or cable is shown in perspective in FIG. 1.

Figure 6:
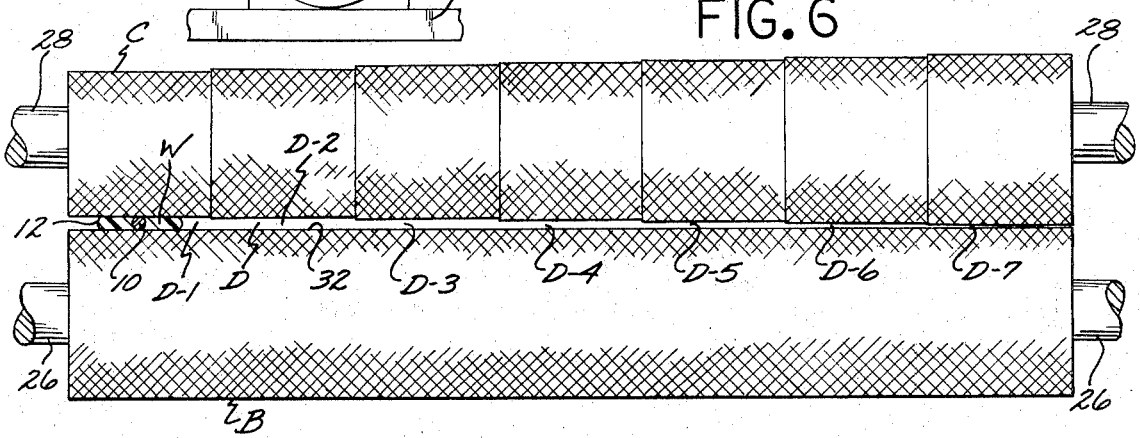
FIG. 6 is a side elevational view of the first pair of rollers.
Figure 7:
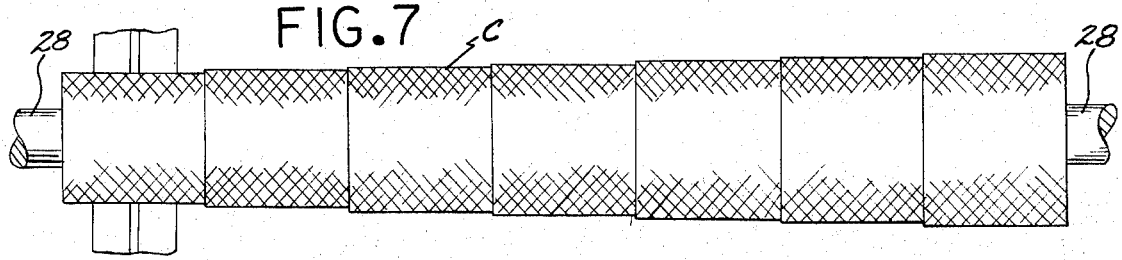
FIG. 7 is a top plan view of the first pair of rollers.

The device A includes two parallel adjacently disposed first and second elongate rollers B and C that are of such configuration as to define a number of longitudinal spaces D therebetween that are of different heights. When the rollers B and C are power driven in the same direction by means that will later be explained in detail, and a length of wire W that has a copper core 10 that has an envelope of insulation 12 extending there-around is fed through an appropriate one of the spaces D, as shown in FIG. 6, the insulation 12 is crushed and peels from the wire. Should it be desired to sever the insulation from the wire by cutting the insulation into a number of longitudinal strips, the first and second rollers B' and C' shown in FIGS. 8 to 10 may be used for this purpose.

The device A preferably includes a heavy table T that is defined by a forward pair of legs 14 and rearward pair of legs 16, with the pairs of legs supporting a horizontal top 18. The pairs of legs 14 and 16 also serve to support a heavy horizontal sheet metal base 20 on which an electric motor 22 is mounted, and secured thereto by conventional means such as bolts 24 or the like.

First and second rollers B and C have pairs of first and second stub shafts 26 and 28 projecting from opposite ends thereof, as shown in FIG. 6. The first roller B is rotatably supported by shafts 26 in a transverse position relative to the forward end 30 of the table, with the upper longitudinal surface 32 of the roller B shown in FIG. 6 disposed slightly above the upper surface of top 18. The shafts 26 are rotatably supported in conventional journal boxes (not shown) secured to side members 18a that form a part of top 18. The forward portions of side members 18a support two laterally spaced journal blocks 33 in which shafts 28 are disposed.

Figure 4:
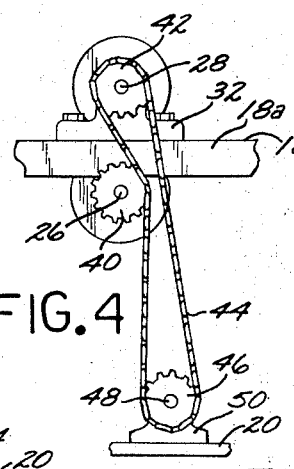

Motor 22 drives a first sprocket 34 that is longitudinally aligned with a second sprocket 36 mounted on shaft 26, with the first and second sprockets being in engagement with a first endless chain belt 38. The right side of the device A as viewed in FIG. 2 has third and fourth sprockets 40 and 42 mounted on shafts 26 and 28 and reigidly secured thereto, as also shown in FIG. 4. Sprockets 40 and 42 are engaged by a second endless chain belt 44 that also engages an idling sprocket 46. The sprocket 46 is rotatably supported by a stub shaft 48 that extends outwardly from a bracket 50 that is secured to base 20. Idling sprocket 46 is vertically aligned with sprockets 40 and 42 and serves to maintain belt 44 in engagement with the sprocket 40, as shown in FIG. 4.

When the motor 22 is electrically energized, first sprocket 34 drives second sprocket 36 by first belt 38, and the rotary motion of the second sprocket being transmitted through first shaft 26 to third sprocket 40. Rotation of third sprocket 40 drives second belt 44, and the motion of the second belt is transmitted to the fourth sprocket 42 to drive the second shaft 28 and rotate the second roller C in an opposite direction to the first roller B, as shown by arrows in FIG. 5.

Figure 2:
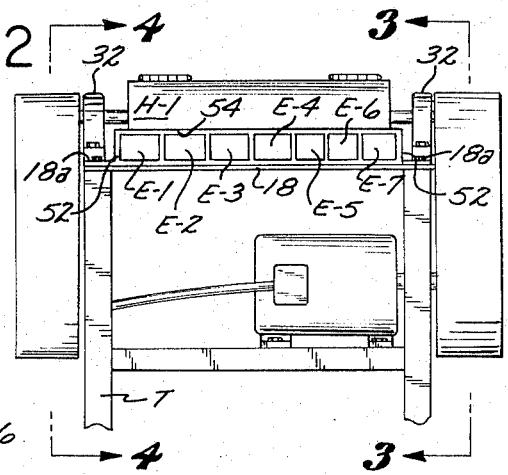
FIG. 2 is a front elevational view of the device.
Figure 3:
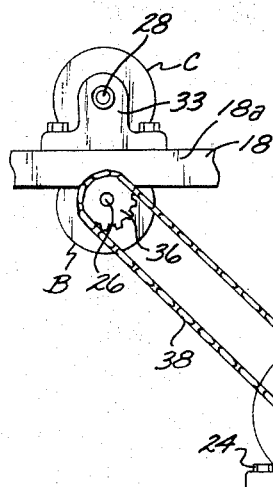
FIG. 3 is a fragmentary longitudinal view of the device taken on the line 4—4 of FIG. 2.
Figure 5:
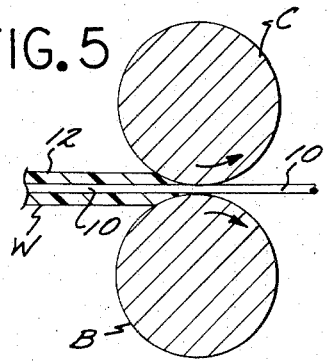
FIG. 5 is a transverse cross-sectional view of a first pair of rollers for crushing insulation on scrap wire as the wire passes therebetween.

The forward end of top 20 has a number of transversely spaced vertical bars 52 projecting upwardly therefrom that cooperate with a crosspiece 54 secured to the tops thereof to define a number of guide openings E-1 to E-7, as shown in FIG. 2. Scrap wire or cable W having a core 10 of copper and a covering of electrical insulation 12 extending therearound, as shown in FIG. 5, may be fed through an appropriate one of the guide openings E-1 to E-7 to frictionally engage the rotating rollers B and C.

Each of the guide openings E-1 to E-7 is longitudinally aligned with one of the spaces D-1 to D-7 defined between the rollers B and C, as shown in FIG. 6. When scrap wire W is fed longitudinally through one of the guide openings E-1 to E-7 that is longitudinally aligned with one of the spaces D-1 to D-7 that has a height that is substantially the same as the diameter of the wire core 10, the rotating rollers B and C frictionally engage the insulation 12 to pull the wire W between the rollers and concurrently crush the insulation to the extent that it separates from the copper core 10. The base core 10, free of insulation 12, is discharged by rotating rollers B and C onto top 20.

The belts 38 and 44 preferably have safety guards 58 and 60 extending therearound, as shown in FIG. 1, that are removably attached to the table T by conventional means (not shown). A transverse safety guard H extends across the forward portion of table T, as viewed in FIG. 1 and extends over the upper portion of second roller C to prevent crushed insulation flying upwardly as the device A operates to strike the user of the device. Guard H is supported by a transversely spaced pair of brackets 62 secured to the upper forward portion of table T by bolts 64 or the like.

If desired, the guard H may include a forwardly disposed, hinge-supported portion H-1 to permit easy access to upper roller C.

Figure 8:
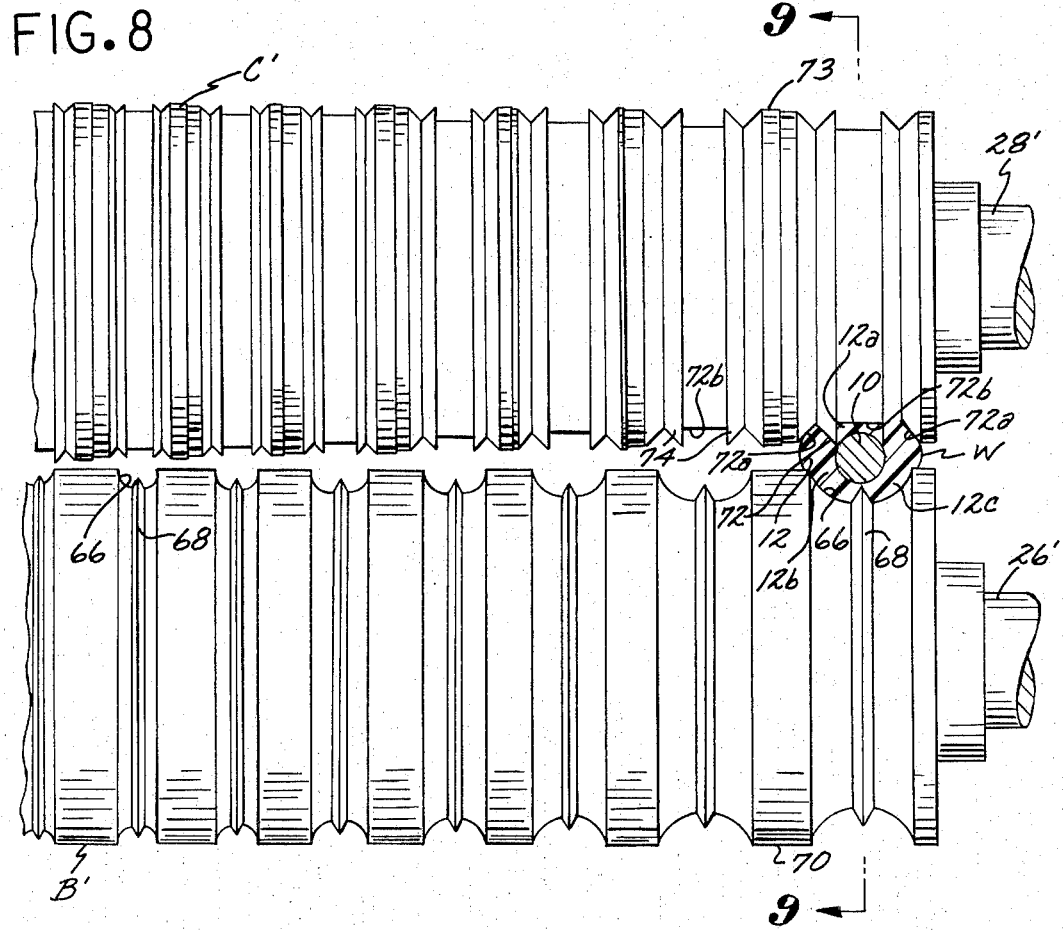
FIG. 8 is a side elevational view of a portion of a second pair of power-driven rollers.
Figure 9:
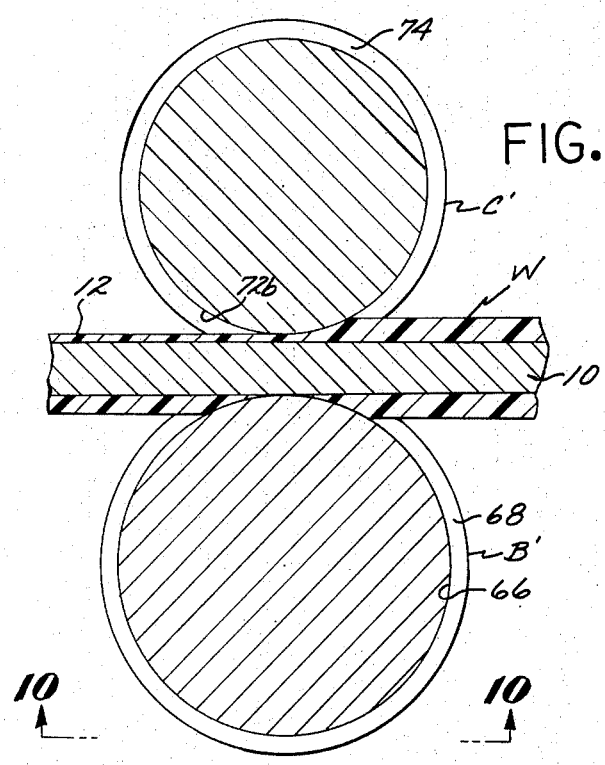
FIG. 9 is a transverse cross-sectional view of the second pair of rollers, taken on the line 9—9 of FIG. 8.
Figure 10:
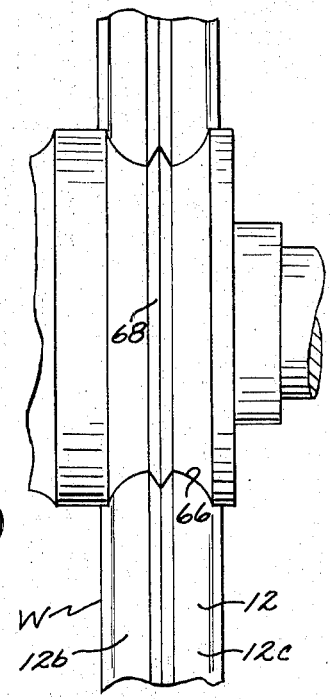
FIG. 10 is a fragmentary bottom plan view of the second pair of rollers, taken on the line 10—10 of FIG. 9.

Should the scrap wire W be of such character that insulation 12 does not readily separate from the copper core 10 when the insulation is crushed, the rollers B and C may be replaced by the rollers B' and C' shown in FIGS. 8 through 10. Rollers B' and C' include shafts 26' and 28' that are identical to the shafts 26 and 28 previously described.

Roller B' has a number of longitudinally spaced, circumferentially extending grooves 66 therein of different widths and depths that are of arcuate shape and of smaller transverse cross sections than the portions of the wires W that will be engaged thereby. Each groove 66 has a first circular knife 68 projecting outwardly from the center thereof, with each knife of such depth as to just touch the core 10 of the wire W, as shown in FIG. 8. Each of the grooves 66 is longitudinally separated from the one next thereto by a cylindrical section 70 of first roller B'.

Second roller C' has a number of longitudinally spaced, circumferentially extending grooves 72 therein that are defined by two spaced ring-shaped surfaces 72a that taper inwardly toward one another and are connected on their inner ends by a cylindrical surface 72b. The surfaces 72a and 72b are so positioned relative to the groove 66 with which they are associated that the surfaces exert substantial pressure on the insulation 12 of a wire W passing therebetween. Two longitudinally spaced second circular knives 74 extend outwardly from each of the grooves 72, as shown in FIG. 8, and are of such depth to contact the copper core 10. When scrap wire W is frictionally pulled through an appropriate set of grooves 66 and 72, as shown in FIG. 8, the two knives 74 and knife 68 associated therewith cut the insulation 12 into a number of longitudinally extending strips 12a, 12b and 12c that easily separate from copper core 10. The grooves 72 are separated from one another by cylindrical sections 73 of roller C'.

It will be apparent that if rollers B' and C' are to replace rollers B and C the lengths of the sections 70 and 73 must be such as to position each set of grooves 66 and 72 in alignment with one of the guide openings E-1 to E-7. When such a replacement is made, the device A is used in the same manner as previously described, but with the insulation 12 now being separated from the copper core 10 by being cut into longitudinal strips 12a, 12b and 12c rather than being crushed as previously described. When the insulation 12 is cut into strips 12a, 12b and 12c, there is some crushing of the insulation as the surfaces defining grooves 66 and 72 must be in frictional pressure contact with the exterior surface of insulation 12, as shown in FIG. 8.

Should it be desired, a device A may be provided in which composite first and second rollers are employed, with each roller having a left-hand portion as shown in FIG. 6, and a right-hand portion as illustrated in FIG. 8. Such a device would require additional guide openings to those guide openings E-1 to E-7 shown in FIG. 2, with the additional guide openings each being aligned with one of the sets of grooves 66 and 72. A device A employing such composite rollers would permit the operator, at his option, to remove insulation 12 from a copper core 10 of wire W either by crushing the insulation or cutting the insulation therefrom. Insulation 12 would preferably be removed by crushing from a copper core 10 when the insulation is aged and is dry and brittle. However, if the insulation 12 retains some resiliency it is preferable to cut the insulation from the core 10.

The use and operation of the invention has previously been described in detail and this information need not be repeated.

I claim:

1. An adjustment and knife free device for removing brittle insulation from scrap cable of different diameters, said cable having a metal core, said device including:

a. first and second elongate, parallel, horizontal adjacently disposed rigid rollers, with said first roller having a plurality of longitudinal cylindrical sections defined thereon of different diameters, which cylindrical sections cooperate with the exterior surface of said second roller to define a plurality of horizontal elongate spaces therebetween, with each of said spaces being of a height different than that of the balance thereof, and each of said spaces being of a height that is substantially the diameter of one of said cores that will be encountered in scrap cable;

b. first and second parallel shafts rigidly secured to said first and second roller and projecting from opposite ends thereof;

c. first and second sets of bearings that rotatably support the end portions of said first and second shafts;

d. a table having first and second ends with said bearings mounted adjacent said first end thereof, and said first roller having the upper extremity thereof substantially flush with the top of said table to permit said core to move across said top after said insulation has been removed therefrom;

e. an electric motor that occupies a fixed position relative to said table;

f. a first sprocket driven by said motor;

g. a second sprocket on a first end portion of said second shaft and in vertical alignment with said first sprocket;

h. a first endless chain belt that engages said first and second sprockets;

i. third and fourth sprockets that are vertically aligned and rigidly secured to second end portions of said first and second shafts;

j. a fifth sprocket that serves as an idler rotatably supported in a fixed position relative to said table and vertically aligned with said third and fourth sprockets; and k. a second endless chain belt that engages said third, fourth and fifth sprockets to transfer rotation of said first shaft to said second shaft to drive said first roller clockwise, and said second roller counter-clockwise;

l. third means that define a plurality of guide openings, with each of said guide openings being axially aligned with one of said spaces, and each of said guide openings being adapted to guide an insulation covered copper wire therethrough to be frictionally gripped by the exterior surface of one of said first roller sections and the portion of the exterior surface of the second roller most adjacent thereto and be moved longitudinally through one of said spaces that is of a height that is substantially the same as the diameter of said core of said cable, with the insulation on said wire being crushed as said wire moves through said space and peels therefrom to expose said core that moves across said top of said table.

* * * * *